S. K. LANDIS.
REVERSING MECHANISM.
APPLICATION FILED APR. 11, 1917.
1,283,531.
Patented Nov. 5, 1918.
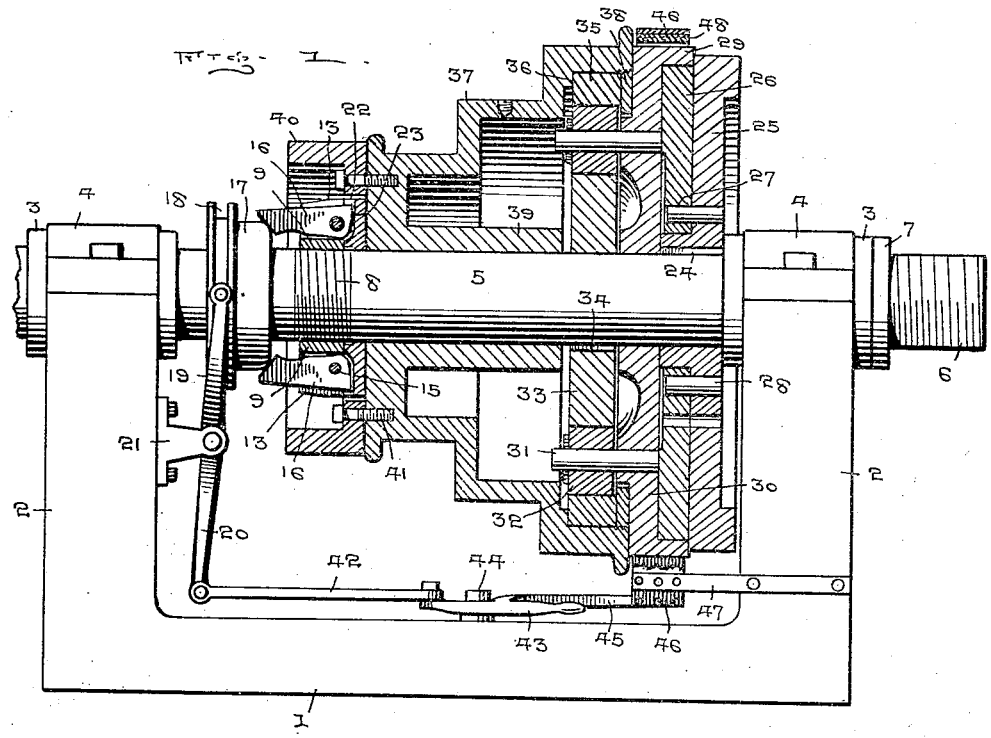
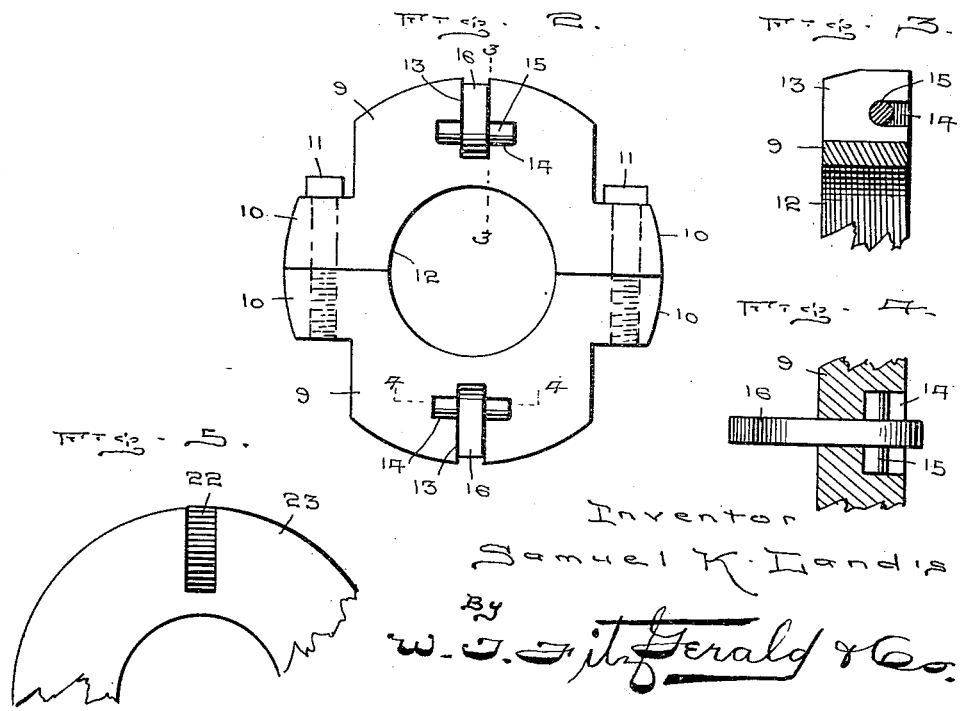
Inventor
Samuel K. Landis
By
W. J. FitzGerald & Co.
Attorneys

UNITED STATES PATENT OFFICE.

SAMUEL K. LANDIS, OF LANCASTER, PENNSYLVANIA.

REVERSING MECHANISM.

1,283,531.  Specification of Letters Patent.  Patented Nov. 5, 1918.

Application filed April 11, 1917. Serial No. 161,269.

*To all whom it may concern:*

Be it known that I, SAMUEL K. LANDIS, a citizen of the United States, residing at Lancaster, in the county of Lancaster and State of Pennsylvania, have invented certain new and useful Improvements in Reversing Mechanism; and I do hereby declare the following to be a full, clear, and exact description of the invention, such as will enable others skilled in the art to which it appertains to make and use the same.

This invention relates to a new and improved reversing mechanism whereby a shaft may be revolved in one direction by the mechanism, or which mechanism may be readily manipulated for driving the shaft in the reverse direction.

One of the objects of this invention is to provide a reversing mechanism, more particularly adapted for driving the spindle of a lathe, and which reversing mechanism is contained in the head of the lathe whereby to eliminate the necessity for countershafts as commonly employed.

Another object of this invention is to provide a reversing mechanism for shafts, spindles, and the like, whereby the direction of rotation of the shaft or spindle may be changed by the manipulation of a single lever.

Another object of this invention is to provide the reversing mechanism with a shock relieving plate to provide flexibility to prevent the spindle from springing by the power of the clutch.

Another object of this invention is to provide a sectional clutch member adjustably secured upon the shaft or spindle to eliminate the possibility of lost motion.

These and other objects and advantages will more fully appear as the nature of the invention is more clearly understood, from the construction, combination and arrangement of the parts thereof as clearly set forth in the following specification, defined in the subject matter of the claims, and illustrated in the several views of the accompanying drawings, in which, Figure 1 is a vertical longitudinal sectional view showing the detail construction of the invention, certain parts however, being shown in full lines.

Fig. 2 is a face view of the sectional clutch body which carries the swinging pawls.

Fig. 3 is a detail sectional view on line 3—3 of Fig. 2.

Fig. 4 is a detail sectional view on line 4—4 of Fig. 2.

Fig. 5 is a detail face view of a portion of the friction disk employed and which coöperates with the device shown in Fig. 2.

I desire to here state that while my invention is primarily adapted for operating the spindle of a turret lathe, the same is equally adapted for use in connection with any power driven shaft, and that my invention is not to be construed as limited to the specific detailed construction as illustrated in the drawings and described in the specification, as I may resort to various alterations and modifications therein to meet the exigencies of the case without departing from the spirit of the invention or the scope of the claims.

Referring to the drawings, wherein similar reference characters denote corresponding parts throughout the several views, 1 denotes the head stock, which is adapted to be suitably secured upon a lathe bed, and is provided at its ends with the standards 2, in the upper ends of which are seated the bearings 3 retained therein by the caps or cover plates 4.

Revolubly mounted within the journals 3 is the spindle 5, preferably hollow, provided with the threaded end 6 for receiving a chuck or the like and upon the spindle 5 at the inner end of the threaded portion 6 is the collar 7 to provide a shoulder against which abuts the chuck or the like when the same is secured upon the threaded end 6 of the spindle 5.

Formed upon the spindle 5 are the screw threads 8 upon which is adjustably threaded the sectional clutch body 9 having each of its sections provided with the ears 10 secured together through the medium of the screw bolts 11 which are designed to draw the ears 10 toward each other for maintaining the sections 9 of the clutch body in its adjusted position upon the threads 8 of the spindle 5, the clutch body being provided with the internal threads 12 for engaging the threads 8 of the spindle 5. Formed in the periphery of the sections 9 of the clutch body are the oppositely disposed radial slots or channels 13 having formed in their side walls the pockets 14 in which are pivotally mounted the pivot pins 15 of the swinging pawls 16. The swinging pawls 16 operate within the channels 13 of the sections 9 of the clutch body with their pivot pins 15 projecting therethrough at a point adjacent their inner curved coacting ends which ends project for a short distance beyond the inner face of the clutch body while the opposite ends of the pawls 16 project for a greater distance outwardly of the outer face of the clutch body and have these ends beveled in opposite directions. The beveled ends of the pawls 16 are adapted to be engaged by the coacting end of the sleeve 17 which is slidably mounted upon the spindle 5 and provided with the annular groove 18 in which groove 18 ride the pins carried by the forked end 19 of the sleeve actuating lever 20 pivotally mounted in the bracket 21 upon the inner side of the standard 2 of the head stock 1, so that when the contacting face of the sleeve 17 is forced against the beveled ends of the pawls 16 these ends of the pawls 16 are spread apart so as to rock the pawls 16 upon their pivot pins 15 in a manner that the curved co-acting ends of the pawls 16 will be forced into the radially disposed recesses 22 of the friction ring 23 which is movably mounted upon the spindle 5.

Rigidly secured upon the spindle 5 by the key 24 is the hub of the friction disk 25 which is positioned upon the spindle 5 at a point adjacent the inner standard 2 of the head stock 1. The disk 25 may have its periphery provided with gear teeth if desired and mounted upon the inner projecting portion of the hub of the disk 25 is the shock relieving plate 26 loosely mounted upon the hub of the disk 25 and provided with the apertures 27 through which project the projecting ends of the pins 28 suitably secured in the body of the disk 25. The shock relieving plate 26 is surrounded by the annular flange of the peripheral face 29 of the flanged plate 30 which is loosely mounted upon the spindle 5 at the inner side of the disk 25 and the shock relieving plate 26. The plate 30 is provided with the stub shafts 31 upon the projecting ends of which are the pinions 32 which are in constant mesh with the gear 33 rigidly secured upon the spindle 5 through the medium of the key 34 at a point just inwardly of the plate 30. The gear pinions 32 are also in constant mesh with the internal gear ring 35 which is maintained in operative position between the shoulder 36 formed in the enlarged end of the step pulley 37 through the medium of the ring 38 which is threaded within the enlarged end of the step pulley 37 at the outer side of the gear ring 35.

The step pulley 37 is formed hollow but is provided with the inwardly extending cylindrical hub 39 which is loosely mounted upon the spindle 5. The step pulley 37 is interposed upon the spindle 5 between the friction disk 23 and the plate 30. Upon the end of the step pulley 37 adjacent the friction disk 23 is the annular guard flange 40 secured to the step pulley 37 by the screw bolts 41, and there may be provided upon the periphery of the guard flange 40 any suitable form of gear teeth if desired. The guard flange 40 surrounds the clutch body 9 and its pawls 16 in a manner to prevent personal contact therewith thereby eliminating the danger of the clothing of the operator of the machine being caught thereby.

The clutch lever 20 is connected by the link 42 to one end of the operating lever 43 pivoted upon the base 1 of the head by the pivot pin 44. The lever 43 is provided with the rigid laterally extending arm 45 having secured to its outer end one end of the metallic brake band 46, which band extends around the periphery of the plate 30 and has its opposite end secured in the bracket 47 mounted upon the inner standard 2 of the head, the brake band 46 being faced upon its inner side with the friction material 48 which may be of any suitable material but preferably of leather.

The operation of the device will be briefly described as follows:—

Assuming the device to be idle, with the hand lever 43 at neutral, or in other words being at a point substantially at right angles to the base 1 of the head, the sleeve 17 will be thrown to the left and the movable friction plate 23 relieved of the force of the pawls 16 and at the same time the brake band 46 will be in spaced relation to the plate 30. To start the device, power is supplied to the step pulley 37 by the usual belt connection and the pulley 37 will revolve loosely around the spindle 5 until the lever 43 is moved from its neutral point to the right, as clearly shown in Fig. 1, and whereby the clutch lever 20 will be swung so as to force the clutch sleeve 17 inwardly against the beveled ends of the pawls 16 which pawls by their contact with the movable friction disk 23 force the same against the pulley 37, which action forces the pulley 37 against the plate 30 and in turn against the shock relieving plate 26 and the rigid friction disk 25 secured upon the spindle 5. This action efficiently binds the step pulley between the movable friction disk 23 and the rigid friction disk 25 and connects the pulley 37 with the spindle 5 for driving the spindle 5 and the parts associated therewith in the same direction. Should it be desired to reverse the direction of the spindle 5, the lever 43 is then swung to the left and sufficiently beyond its neutral point so as to swing the clutch lever 20 in the opposite direction for moving the clutch sleeve 17 sufficiently to the left and out of contact with the beveled ends of the pawls 16 so that the pawls 16 will cease to force the movable friction disk 23 inwardly against the pulley 37 whereby the pulley 37 will no longer be impinged or bound between the movable friction disk 23 and the rigid friction disk 25. At the same time that the lever is thus moved to the left the arm 45 of the lever 43 will be swung in a manner to draw the brake band 46 around the plate 30 so as to hold the plate 30 stationary and when this is accomplished the gear ring 35 of the pulley 37 will revolve the pinions 32 in such a manner as to revolve the gear 33 and spindle 5 in a direction opposite to that of the step pulley 37 and the spindle 5 will continue to be driven in this reverse direction until the operating lever 43 is again actuated.

Having described my invention, what I claim as new and desire to secure by Letters Patent, is:—

1. In a device of the character specified, the combination of a driven shaft, a disk rigidly mounted upon said shaft, a drive pulley rotatably mounted upon said shaft at one side of said rigidly mounted disk, a guard member upon said drive pulley, a movable disk upon said shaft within said guard member, means for actuating said movable disk also within said guard member, and means for actuating said movable disk actuating means for impinging said pulley between said disks for operatively connecting said shaft and said pulley.

2. In a device of the character specified, the combination of a shaft, a disk rigidly mounted upon said shaft, a disk movably mounted upon said shaft, a drive pulley rotatably mounted upon said shaft between said disks, means upon said shaft for actuating said movably mounted disk for impinging said pulley between said disks for operatively connecting said shaft and said pulley, and means for operating said movably mounted disk actuating means.

3. In a device of the character specified, the combination of a shaft, a disk rigidly mounted upon said shaft, a disk movably mounted upon said shaft, a drive pulley rotatably mounted upon said shaft between said disks, a reversing mechanism loosely mounted upon said shaft between said rigidly mounted disk and said pulley, means upon said shaft for actuating said movably mounted disk for impinging said pulley between said movably mounted disk and said reversing mechanism and said rigidly mounted disk for operatively connecting said shaft and said pulley, means for retaining said reversing mechanism against movement, and means for operating said movably mounted disk actuating means and said retaining means for revolving said shaft in either direction.

4. In a device of the character specified, the combination of a shaft, a disk rigidly mounted upon said shaft, a shock relieving plate mounted upon the inner face of said rigidly mounted disk, a disk movably mounted upon said shaft, a drive pulley rotatably mounted upon said shaft between said disks, a reversing mechanism loosely mounted upon said shaft between said shock relieving plate of said rigidly mounted disk and said pulley, means upon said shaft for actuating said movably mounted disk for impinging said pulley and said reversing mechanism between said movably mounted disk and said rigidly mounted disk and its shock relieving plate for operatively connecting said shaft and said pulley, means for retaining said reversing mechanism against movement, and means for operating said movably mounted disk actuating means and said retaining means for revolving said shaft in either direction.

5. In a reversing mechanism for lathes, the combination of a head stock, a hollow spindle, a drive pulley rotatably mounted upon said spindle, a pair of friction disks upon said spindle for embracing said pulley, means to actuate the disks into frictional contact with said drive pulley for connecting said spindle and said pulley, means for operating said disk actuating means, a reversing mechanism interposed between said spindle and said pulley, and comprising a spur gear keyed upon said spindle within said pulley, a flange plate loosely mounted on said spindle adjacent said spur gear, studs formed on said flanged plate, gear pinions mounted upon said studs and in mesh with the spur gear on the spindle, an internal gear upon said drive pulley and meshing with said gear pinions, a brake band embracing the periphery of said flanged plate for preventing the rotation of the same, and means for operating said brake band for reversing the direction of rotation of the spindle with respect to the drive pulley.

6. In a device of the character specified, the combination of a shaft, a rigid disk upon said shaft, a movable disk upon said shaft, a drive pulley rotatably mounted upon said shaft between said disks, a support upon said shaft adjacent said movable disk, actuating members upon said support, a sleeve upon said shaft, and means to operate said sleeve to cause said actuating members to actuate said movable disk for impinging said pulley between said disks for connecting said shaft and said pulley.

7. In a device of the character specified, the combination of a shaft, a rigid disk upon said shaft, a movable disk upon said shaft, a drive pulley rotatably mounted upon said shaft between said disks, a support adjustably secured upon said shaft adjacent said movable disk, swinging pawls upon said support, a sleeve slidably mounted upon said shaft adjacent said swinging pawls, and means to operate said sleeve to cause said swinging pawls to actuate said movable disk for impinging said pulley between said disks for connecting said shaft and said pulley.

In testimony whereof I have signed my name to this specification in the presence of two subscribing witnesses.

SAMUEL K. LANDIS.

Witnesses:
 CHAS. F. STAUFFER,
 M. C. STONER.

Copies of this patent may be obtained for five cents each, by addressing the "Commissioner of Patents, Washington, D. C."